(12) United States Patent
Goodwin

(10) Patent No.: US 12,012,943 B2
(45) Date of Patent: Jun. 18, 2024

(54) WIND TURBINE ASSEMBLY

(71) Applicant: James Goodwin, Richwood, OH (US)

(72) Inventor: James Goodwin, Richwood, OH (US)

(*) Notice: Subject to any disclaimer, the term of this patent is extended or adjusted under 35 U.S.C. 154(b) by 0 days.

(21) Appl. No.: 17/984,826

(22) Filed: Nov. 10, 2022

(65) Prior Publication Data

US 2024/0159220 A1 May 16, 2024

(51) Int. Cl.
| | |
|---|---|
| F03D 9/00 | (2016.01) |
| F03D 1/04 | (2006.01) |
| F03D 9/25 | (2016.01) |
| F03D 9/46 | (2016.01) |
| H02K 7/10 | (2006.01) |
| H02K 7/18 | (2006.01) |

(52) U.S. Cl.
CPC ............ *F03D 9/46* (2016.05); *F03D 1/04* (2013.01); *F03D 9/25* (2016.05); *F05B 2220/706* (2013.01); *F05B 2240/9113* (2013.01); *H02K 7/1004* (2013.01); *H02K 7/1838* (2013.01)

(58) Field of Classification Search
CPC ..... F03D 9/46; F03D 1/04; F03D 9/25; F05B 2220/706; F05B 2240/9113; H02K 7/1838
See application file for complete search history.

(56) References Cited

U.S. PATENT DOCUMENTS

| | | | |
|---|---|---|---|
| 4,070,131 A * | 1/1978 | Yen | .......................... F03D 13/20 |
| | | | 415/4.4 |
| 7,427,173 B2 | 9/2008 | Chen | |
| D587,196 S | 2/2009 | Chong | |
| 8,328,499 B2 | 12/2012 | Mauro | |
| 8,729,725 B2 | 5/2014 | Choi | |
| 10,539,120 B2 | 1/2020 | Uliano | |
| 2007/0264116 A1 | 11/2007 | Dempster | |
| 2011/0316279 A1* | 12/2011 | Bahari | ....................... F03D 1/04 |
| | | | 290/55 |
| 2018/0102690 A1* | 4/2018 | Martinez Ruvalcaba | ................... |
| | | | F03D 9/46 |

FOREIGN PATENT DOCUMENTS

WO WO2017100884 6/2017

* cited by examiner

*Primary Examiner* — Julio C. Gonzalez

(57) ABSTRACT

A wind turbine assembly for covering wind energy into electrical energy includes a housing that is positioned adjacent to a roadway. An intake chute is integrated into the housing and the intake chute is oriented to face oncoming traffic on the roadway thereby facilitating the intake chute to direct wind produced by the oncoming traffic into the housing. A wind turbine is rotatably disposed within the intake chute such that the wind turbine is rotated by the wind produced by the oncoming traffic. A generator is positioned in the housing and the generator is in mechanical communication with the wind turbine. The generator is rotated when the wind turbine rotates to convert wind energy into electrical energy.

6 Claims, 4 Drawing Sheets

WIND TURBINE ASSEMBLY

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(d) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to wind turbine devices and more particularly pertains to a new wind turbine device for converting wind energy into electrical energy. The device includes a housing that is buried adjacent to roadway and an intake chute that is integrated into the housing. The intake chute is oriented such that wind produced by oncoming traffic on the roadway enters the intake chute. A wind turbine is rotatably disposed in the intake chute and the wind turbine is rotated by the wind entering the intake chute. A generator is disposed in the housing and the generator is mechanically coupled to the wind turbine such that the wind turbine rotates the generator for converting wind energy into electrical energy.

(2) Description of Related Art Including Information Disclosed Under 37 CFR 1.97 and 1.98

The prior art relates to wind turbine devices including a wind draft generator comprising a housing that has an elongate hexagonal shape which is positioned adjacent to a roadway and which an air conduit extending through the housing and an air turbine rotatably disposed in the housing which is rotated by wind produced by traffic on the roadway. The prior art discloses a wind generator that includes a roadway with a trench running along a middle of the roadway for capturing wind from traffic traveling along the roadway and a wind turbine disposed within the trench. The prior art discloses a wind generator which includes a base buried under ground adjacent to a roadway, a stanchion extending upwardly from the base, a cylindrical housing positioned on the stanchion and a wind turbine positioned in the cylindrical housing. The prior art discloses a wind generator that includes a plurality of wind turbines each rotatably disposed on a trailer and a plurality of deflectors attached to the trailer for directing wind through the wind turbines. The prior art discloses a wind generator that includes a traffic barrier, a track attached to an upper edge of the traffic barrier and a plurality of wind turbines attached to the track.

(h) BRIEF SUMMARY OF THE INVENTION

An embodiment of the disclosure meets the needs presented above by generally comprising a housing that is positioned adjacent to a roadway. An intake chute is integrated into the housing and the intake chute is oriented to face oncoming traffic on the roadway thereby facilitating the intake chute to direct wind produced by the oncoming traffic into the housing. A wind turbine is rotatably disposed within the intake chute such that the wind turbine is rotated by the wind produced by the oncoming traffic. A generator is positioned in the housing and the generator is in mechanical communication with the wind turbine. The generator is rotated when the wind turbine rotates to convert wind energy into electrical energy.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
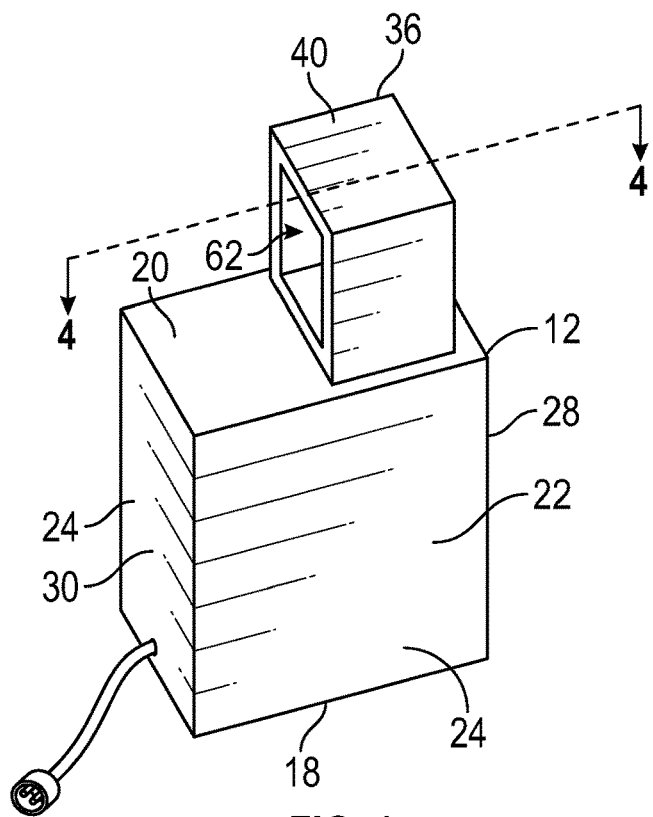
FIG. 1 is a top perspective view of a wind turbine assembly according to an embodiment of the disclosure.
Figure 2:
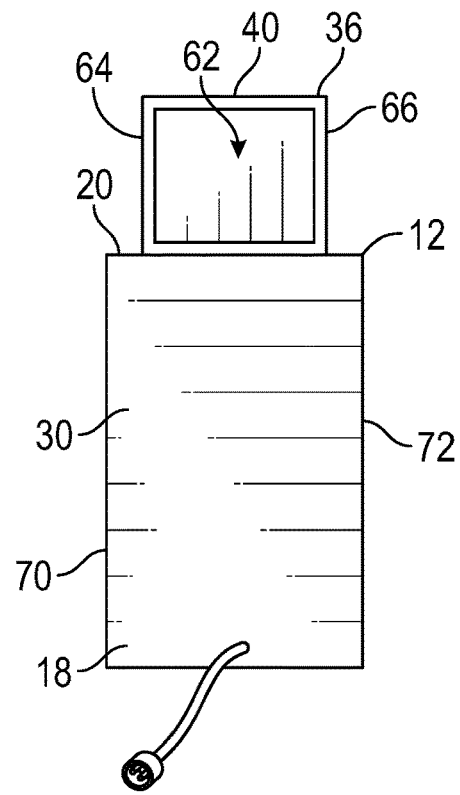
FIG. 2 is a front view of an embodiment of the disclosure.
Figure 3:
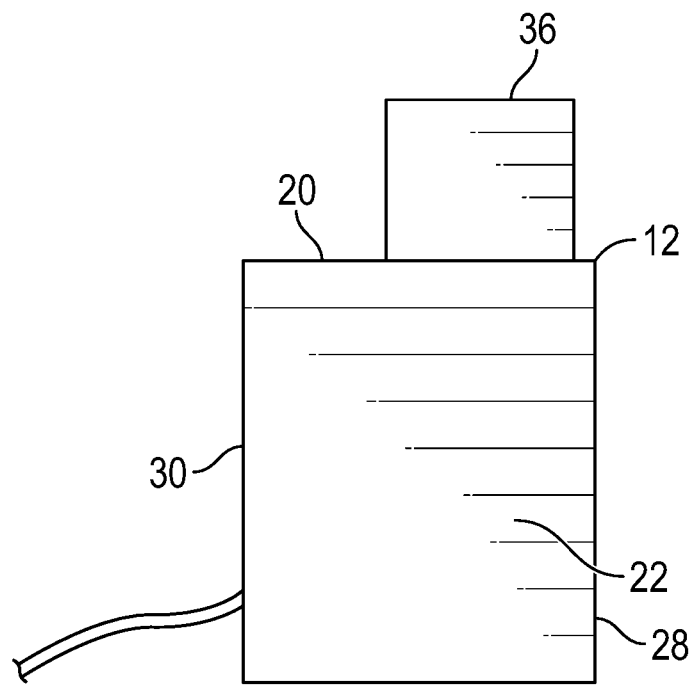
FIG. 3 is a left side view of an embodiment of the disclosure.
Figure 4:
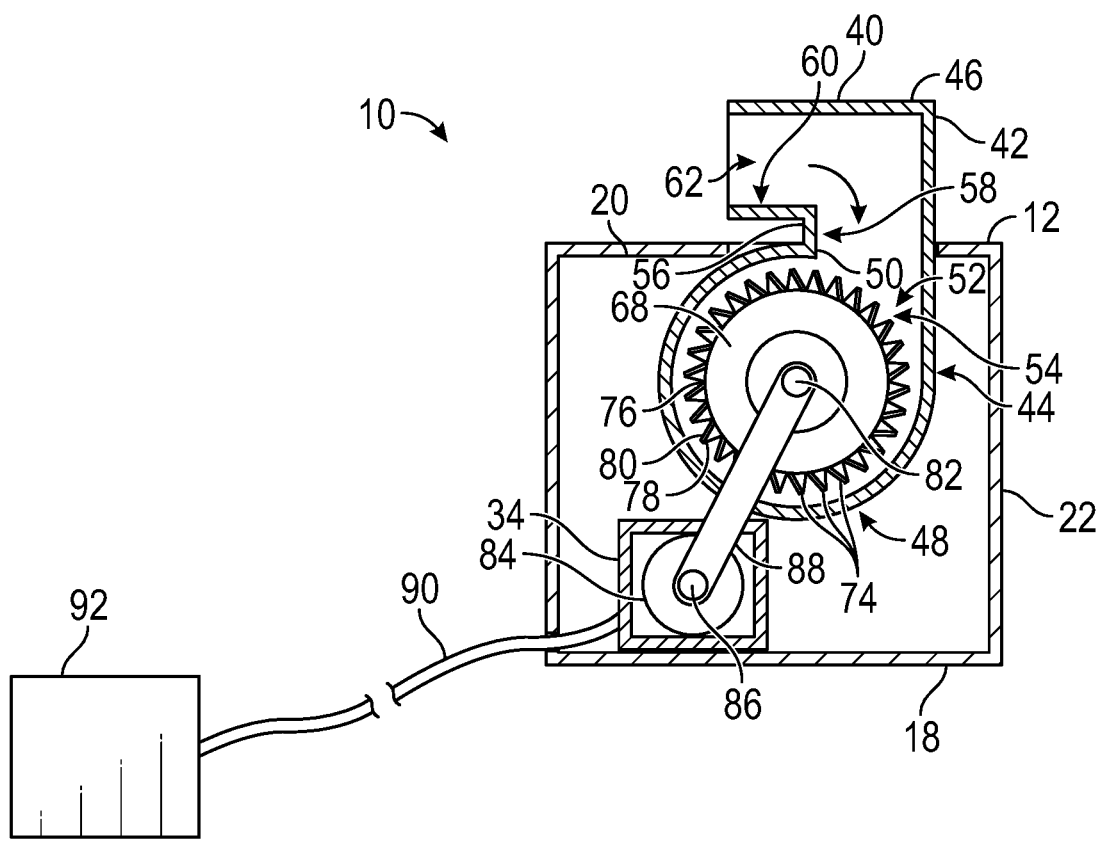
FIG. 4 is a cross sectional view taken along line 4-4 of FIG. 1 of an embodiment of the disclosure.

With reference now to the drawings, and in particular to FIGS. 1 through 6 thereof, a new wind turbine device embodying the principles and concepts of an embodiment of the disclosure and generally designated by the reference numeral 10 will be described.

As best illustrated in FIGS. 1 through 6, the wind turbine assembly 10 generally comprises a housing 12 that is positioned adjacent to a roadway 14. The roadway 14 may be a highway or any other public roadway upon which motorized vehicles 16 commonly travel. The housing 12 has a bottom wall 18, a top wall 20 and an outer wall 22 extending between the top wall 20 and the bottom wall 18 and the outer wall 22 has a plurality of intersecting sides 24 such that the housing 12 has a rectilinear shape. The top wall 20 has an opening 26 extending into an interior of the housing 12 and the opening 26 is positioned closer to a back side 28 of the outer wall 22 than a front side 30 of the outer wall 22.

Figure 5:
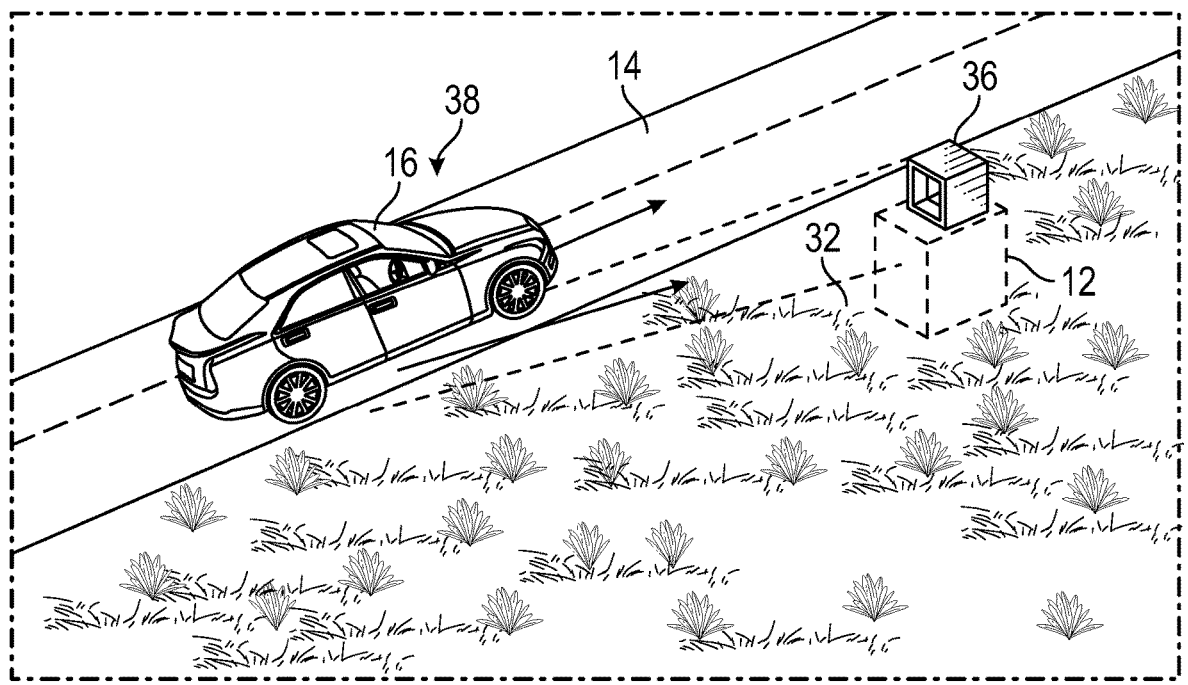
FIG. 5 is a top perspective in-use view of an embodiment of the disclosure.
Figure 6:
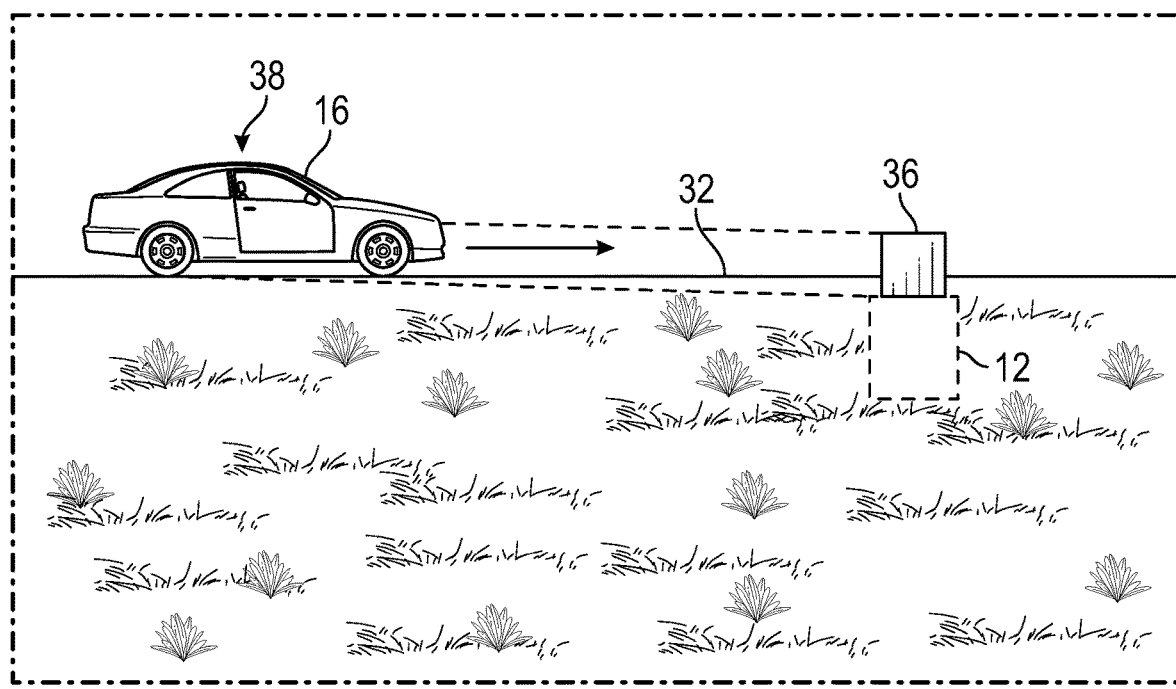
FIG. 6 is a perspective in-use view of an embodiment of the disclosure.

As is most clearly shown in FIGS. 5 and 6, the housing 12 is buried in the ground 32 such that the top wall 20 of the housing 12 is exposed. The housing 12 has a generator chamber 34 that is positioned within the housing 12. The generator chamber 34 rests on the bottom wall 18. Furthermore, the generator chamber 34 is positioned closer to the front side 30 of the outer wall 22 than the back side 28 of the outer wall 22.

An intake chute 36 is integrated into the housing 12 and the intake chute 36 is oriented to face oncoming traffic 38 on the roadway 14 thereby facilitating the intake chute 36 to direct wind produced by the oncoming traffic 38 into the housing 12. The intake chute 36 has an upper wall 40 and a rear wall 42 and the rear wall 42 has a planar portion 44 which is perpendicularly oriented with the upper wall 40 having the planar portion 44 extending downwardly from a rear edge 46 of the upper wall 40. The rear wall 42 has a curved portion 48 which has a terminal edge 50 and the curved portion 48 curls toward the planar portion 44 of the rear wall 42 such the terminal edge 50 is directed toward the planar portion 44 of the rear wall 42 at a point spaced downwardly from the upper wall 40. Moreover, the curved portion 48 defines a throat 52 between the terminal edge 50 and the planar portion 44 of the rear wall 42 and the curved portion 48 defines a turbine space 54 that is positioned beneath the throat 52.

The intake chute 36 has a forward wall 56 which has a first portion 58 that is perpendicularly oriented with a second portion 60. The first portion 58 extends upwardly from the terminal edge 50 of the curved portion 48 of the rear wall 42 such that the first portion 58 lies on a plane that is oriented parallel with the planar portion 44 of the rear wall 42. The second portion 60 lies on a plane that is oriented parallel with the upper wall 40 of the intake chute 36 such that the upper wall 40 and the second portion 60 define an air opening 62 into the intake chute 36. The intake chute 36 has a first lateral wall 64 and a second lateral wall 66 each extending between the upper wall 40 and the second portion 60 of the forward wall 56 such that each of the first lateral wall 64 and the second lateral wall 66 bounds the air opening 62.

The turbine space 54 is positioned within the housing 12 such having the planar portion 44 of the rear wall 42 and the first portion 58 of the forward wall 56 extending upwardly through the opening 26 in the top wall 20 of the housing 12. Additionally, the intake chute 36 is oriented such that the air opening 62 is directed toward the front side of the outer wall 22 of the housing 12. In this way the wind produced by the oncoming traffic 38 enters the air opening 62 and passes through the throat 52 and into the turbine space 54.

A wind turbine 68 is rotatably disposed within the intake chute 36 such that the wind turbine 68 is rotated by the wind produced by the oncoming traffic 38. The wind turbine 68 is positioned within the turbine space 54 and the wind turbine 68 has a rotational axis extending between a first sidelong side 70 and a second sidelong side 72 of the outer wall 22 of the housing 12. The wind turbine 68 has a plurality of vanes 74 and the vanes 74 are spaced apart from each other and are distributed around a full circumference of an outer surface 76 of the wind turbine 68. Each of the vanes 74 has a forward side 78 that is perpendicularly oriented with the outer surface 76 of the wind turbine 68 and the forward side 78 of each of the vanes 74 is open. Each of the vanes 74 has a rearward side 80 angling between the forward side 78 and the outer surface 76 of the wind turbine 68. Furthermore, each of the vanes 74 is oriented such that the forward side 78 of the vanes 74 is directed toward the throat 52 when the wind turbine 68 rotates thereby facilitating the forward side 78 of the vanes 74 to capture the wind directed through the throat 52 thereby facilitating the plurality of vanes 74 to rotate the wind turbine 68.

A first pulley 82 is attached to the wind turbine 68 and the first pulley 82 has a rotational axis that is collinear with the rotational axis of the wind turbine 68. A generator 84 is positioned in the housing 12 and the generator 84 is in mechanical communication with the wind turbine 68. The generator 84 is rotated when the wind turbine 68 rotates to convert wind energy into electrical energy. Additionally, the generator 84 is positioned within the generator chamber 34. A second pulley 86 is attached to the generator 84 and a belt 88 extends around the first pulley 82 and the second pulley 86. In this way the first pulley 82 is mechanically coupled to the second pulley 86 thereby facilitating the wind turbine 68 to rotate the generator 84.

A power cord 90 is electrically coupled to the generator 84 and the power cord 90 extends outwardly through the outer wall 22 of the housing 12. The power cord 90 is electrically coupled to a power storage device 92 for storing electrical energy produced by the generator 84. The power storage device 92 may be an existing electrical grid operated and maintained by a municipal electrical company. Furthermore, the power storage device 92 may be a battery or any other type of storage device commonly employed for storing electrical energy.

In use, the wind produced by oncoming traffic 38 on the roadway 14 enters the intake chute 36 and travels into the turbine space 54 in the intake chute 36 when the oncoming traffic 38 passes by the housing 12 and the intake chute 36. In this way the wind 68 turbine is rotated by the wind. The wind turbine 68 rotates the generator 84 thereby facilitating the wind energy to be converted into electrical energy. Furthermore, the electrical energy produced by the generator 84 is stored in the power storage device 92. In this way clean electrical energy is produced from wind energy without requiring the use of conventional wind turbines that commonly threaten wildlife as well as occupying large amounts of land that could otherwise be employed for farming or other agricultural activities. Additionally, the wind turbine 68 can be rotated by natural wind when the natural wind is moving in an appropriate direction to enter the intake chute 36.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind turbine assembly for harnessing wind produced by vehicles traveling on a roadway for generating electrical energy, said assembly comprising:
   a housing being positioned adjacent to a roadway, said housing having a bottom wall, a top wall and an outer wall, the outer wall extending between said top wall and said bottom wall, said outer wall having a plurality of intersecting sides such that said housing has a rectilinear shape said top wall having an opening extending into an interior of said housing, said opening being positioned closer to a back side of said outer wall than a front side of said outer wall said housing having a generator chamber positioned within said housing, said generator chamber resting on said bottom wall, said generator chamber being positioned closer to said front side of said outer wall than said back side of said outer wall;
   an intake chute being integrated into said housing, said intake chute being oriented to face oncoming traffic on the roadway thereby facilitating said intake chute to direct wind produced by the oncoming traffic into said housing, said intake chute having an upper wall and a rear wall, said rear wall having a planar portion being perpendicularly oriented with said upper wall having said planar portion extending downwardly from a rear edge of said upper wall, said rear wall having a curved portion which has a terminal edge, said curved portion curling toward said planar portion of said rear wall such said terminal edge is directed toward said planar portion of said rear wall at a point being spaced downwardly from said upper wall to define a throat between said terminal edge and said planar portion of said rear wall, said curved portion defining a turbine space being positioned beneath said throat, said intake chute having a forward wall which has a first portion perpendicularly oriented with a second portion, said first portion extending upwardly from said terminal edge of said curved portion of said rear wall such that said first portion lies on a plane which is oriented parallel with said planar portion of said rear wall, said second portion lying on a plane which is oriented parallel with said upper wall of said intake such that said upper wall and said second portion define an air opening into said intake chute, said intake chute having a first lateral wall and a second lateral wall each extending between said upper wall and said second portion of said forward wall such that each of said first lateral wall and said second lateral wall bounds said air opening;
   a wind turbine being rotatably disposed within said intake chute such that said wind turbine is rotated by the wind produced by the oncoming traffic; and
   a generator being positioned in said housing, said generator being in mechanical communication with said wind turbine, said generator being rotated when said wind turbine rotates wherein said generator is configured to convert wind energy into electrical enemy, said generator is positioned within said generator chamber.

2. The assembly according to claim 1, wherein:
   said turbine space is positioned within said housing such having said planar portion of said rear wall and said first portion of said forward wall extending upwardly through said opening in said top wall of said housing; and
   said intake chute is oriented such that said air opening is directed toward said front side of said outer wall of said housing thereby facilitating the wind produced by the oncoming traffic to enter said air opening and pass through said throat and into said turbine space.

3. The assembly according to claim 1, wherein:
   said wind turbine is positioned within said turbine space, said wind turbine having a rotational axis extending between a first sidelong side and a second sidelong side of said outer wall of said housing;
   said wind turbine has a plurality of vanes being spaced apart from each other and being distributed around a full circumference of an outer surface of said wind turbine, each of said vanes having a forward side being perpendicularly oriented with said outer surface of said wind turbine, said forward side of each of said vanes being open, each of said vanes having a rearward side angling between said forward side and said outer surface of said wind turbine; and
   said plurality of vanes is oriented such that said forward side of said vanes is directed toward said throat when said wind turbine rotates thereby facilitating said forward side of said vanes to capture the wind directed through said throat thereby facilitating said plurality of vanes to rotate said wind turbine.

4. The assembly according to claim 1, further comprising:
   a first pulley being attached to said wind turbine, said first pulley having a rotational axis being collinear with a rotational axis of said wind turbine;
   a second pulley being attached to said generator; and
   a belt extending around said first pulley and said second pulley such that said first pulley is mechanically coupled to said second pulley thereby facilitating said wind turbine to rotate said generator.

5. The assembly according to claim 1, further comprising a power cord being electrically coupled to said generator, said power cord extending outwardly through said outer wall of said housing, said power cord being electrically coupled to a power storage device for storing electrical energy produced by said generator.

6. A wind turbine assembly for harnessing wind produced by vehicles traveling on a roadway for generating electrical energy, said assembly comprising:
   a housing being positioned adjacent to a roadway, said housing having a bottom wall, a top wall and an outer wall extending between said top wall and said bottom wall, said outer wall having a plurality of intersecting sides such that said housing has a rectilinear shape, said top wall having an opening extending into an interior of said housing, said opening being positioned closer to a back side of said outer wall than a front side of said outer wall, said housing having a generator chamber being positioned within said housing, said generator chamber resting on said bottom wall, said generator chamber being positioned closer to said front side of said outer wall than said back side of said outer wall:
   an intake chute being integrated into said housing, said intake chute being oriented to face oncoming traffic on the roadway thereby facilitating said intake chute to direct wind produced by the oncoming traffic into said housing, said intake chute having an upper wall and a rear wall, said rear wall having a planar portion being perpendicularly oriented with said upper wall having said planar portion extending downwardly from a rear edge of said upper wall, said rear wall having a curved portion which has a terminal edge, said curved portion curling toward said planar portion of said rear wall such said terminal edge is directed toward said planar portion of said rear wall at a point being spaced downwardly from said upper wall to define a throat between said terminal edge and said planar portion of said rear wall, said curved portion defining a turbine space being positioned beneath said throat, said intake chute having a forward wall which has a first portion being perpendicularly oriented with a second portion, said first portion extending upwardly from said terminal edge of said curved portion of said rear wall such that said first portion lies on a plane being oriented parallel with said planar portion of said rear wall, said second portion lying on a plane being oriented parallel with said upper wall of said intake such that said upper wall and said second portion define an air opening into said intake chute, said intake chute having a first lateral wall and a second lateral wall each extending between said upper wall and said second portion of said forward wall such that each of said first lateral wall and said second lateral wall bounds said air opening, said turbine space being positioned within said housing such having said planar portion of said rear wall and said first portion of said forward wall extending upwardly through said opening in said top wall of said housing, said intake chute being oriented such that said air opening is directed toward said front side of said outer wall of said housing thereby facilitating the wind produced by the oncoming traffic to enter said air opening and pass through said throat and into said turbine space;

a wind turbine being rotatably disposed within said intake chute such that said wind turbine is rotated by the wind produced by the oncoming traffic, said wind turbine being positioned within said turbine space, said wind turbine having a rotational axis extending between a first sidelong side and a second sidelong side of said outer wall of said housing, said wind turbine having a plurality of vanes being spaced apart from each other and being distributed around a full circumference of an outer surface of said wind turbine, each of said vanes having a forward side being perpendicularly oriented with said outer surface of said wind turbine, said forward side of each of said vanes being open, each of said vanes having a rearward side angling between said forward side and said outer surface of said wind turbine, said plurality of vanes being oriented such that said forward side of said vanes are directed toward said throat when said wind turbine rotates thereby facilitating said forward side of said vanes to capture the wind directed through said throat thereby facilitating said plurality of vanes to rotate said wind turbine;

a first pulley being attached to said wind turbine, said first pulley having a rotational axis being collinear with said rotational axis of said wind turbine;

a generator being positioned in said housing, said generator being in mechanical communication with said wind turbine, said generator being rotated when said wind turbine rotates wherein said generator is configured to convert wind energy into electrical energy, said generator being positioned within said generator chamber;

a second pulley being attached to said generator;

a belt extending around said first pulley and said second pulley such that said first pulley is mechanically coupled to said second pulley thereby facilitating said wind turbine to rotate said generator; and a power cord being electrically coupled to said generator, said power cord extending outwardly through said outer wall of said housing, said power cord being electrically coupled to a power storage device for storing electrical energy produced by said generator.

\* \* \* \* \*